United States Patent
Zhou et al.

[19]

[11] Patent Number: 6,014,719
[45] Date of Patent: Jan. 11, 2000

[54] MODULATED BUS COMPUTER SYSTEM HAVING FILTERS WITH DIFFERENT FREQUENCY COVERAGES FOR DEVICES ON THE BUS

[75] Inventors: Yan Zhou; Saf Asghar, both of Austin, Tex.

[73] Assignee: Advanced Micro Devices Inc., Sunnydale, Calif.

[21] Appl. No.: 08/914,611

[22] Filed: Aug. 21, 1997

Related U.S. Application Data

[60] Provisional application No. 60/040,112, Mar. 7, 1997.

[51] Int. Cl.[7] .................................................. G06F 13/42
[52] U.S. Cl. ........................ 710/107; 710/16; 710/104; 710/126
[58] Field of Search .................. 395/306–311, 284–285, 395/287, 290, 835–836; 370/120, 123, 71–74, 111, 118

[56] References Cited

U.S. PATENT DOCUMENTS

| | | | |
|---|---|---|---|
| 4,757,497 | 7/1988 | Beierle et al. ............................. | 370/89 |
| 5,101,478 | 3/1992 | Fu et al. .................................... | 395/821 |
| 5,150,365 | 9/1992 | Hirata et al. .............................. | 370/123 |
| 5,355,126 | 10/1994 | Nelson et al. ........................ | 340/825.44 |
| 5,734,843 | 3/1998 | Gephardt et al. ......................... | 395/287 |
| 5,787,116 | 7/1998 | Lam et al. ................................ | 375/222 |
| 5,787,256 | 7/1998 | Marik et al. ........................ | 395/200.68 |
| 5,809,262 | 9/1998 | Potter ....................................... | 395/309 |

*Primary Examiner*—Ayaz R. Sheikh
*Assistant Examiner*—Raymond N Phan
*Attorney, Agent, or Firm*—Foley & Lardner

[57] ABSTRACT

A modulated bus interconnects each of the plurality of elements on the bus through a filter having a center frequency corresponding to a carrier frequency which modulated by digital information destined for the particular device. Since the device receives an incoming message through a filter, it detects only those messages which have the appropriate filter characteristics. In order to send a message to another device, the first device must apply the appropriate carrier. Thus, multiple transfers between multiple devices can take place simultaneously on a wide-band transmission medium. A controller can be used to dynamically allocate the bus according to an efficient allocation scheme.

12 Claims, 4 Drawing Sheets

MODULATED BUS COMPUTER SYSTEM HAVING FILTERS WITH DIFFERENT FREQUENCY COVERAGES FOR DEVICES ON THE BUS

This application claims benefit of Provisional application Ser. No. 60/040,112 filed Mar. 7, 1997.

BACKGROUND OF THE INVENTION

1. Field of the Invention

The invention relates to communication of information among devices connected via a bus or transmission medium. In particular, the invention relates to communication of information between processing and peripheral devices on a bus or network.

2. Related Art

Conventional systems require extensive hand shaking protocols to prevent message collision and disruption of data. Techniques which have been employed include token passing, collision detection multiple access techniques, request and acknowledge signal protocols, and processor interrupts to service data processor requests by peripheral requests by peripheral devices.

Each protocol process results in signal processing delays and data transmission and reception delays while information waits in a queue as bus contention is resolved. In addition, the circuitry required to perform such bus contention resolution functions and to establish such queues adds to the cost of processing and peripheral devices.

Furthermore, transfer of some information, such as video information, to a processor from a device such as a CD-ROM to a display card requires data compression. Such compression further adds to the cost and may degrade the quality of the information.

SUMMARY OF THE INVENTION

In view of the above limitations of the related art, it is an object of the invention to provide a system which efficiently transfers information among communicatively interconnected devices.

It is a still further object of the invention to reduce the need for information transfer protocols.

The above and other objects of the invention are addressed by a computer system in which a plurality of devices are communicatively linked over a bus for information transfer. Each one of the devices is linked to the bus to receive incoming messages through a separate filter. Each of the filters has a characteristic unique to the device that links to the bus. Each of the devices also includes a modulator. The modulator is used by a device acting as a message source to modulate outgoing messages in order to correspond with the filter characteristics unique to the destination device received in the outgoing message.

The devices making up the system can be information processing devices such as a processor and peripheral devices to support the processor. The filter characteristics would include center frequency and bandwidth. In addition, each device may include an encoder which is used to translate digital information into a serial bit stream. One example of such an encoder would encode information using 32 level phase shift keying.

According to another aspect of the invention, the filter characteristics may be preset or may be programmable. In the case of programmable filters, a control processor can be used to transmit parameters to each of the filters and to the devices. The control processor could broadcast information identifying the device and its corresponding filter characteristics. The information would be stored by each of the devices for future use when transmitting information to other devices. The control processor can transmit the filter parameter information either over the information bus or over a dedicated control bus.

In another aspect of the invention, the control processor can monitor message traffic on the bus for information transfer and dynamically reconfigure the filter characteristic parameters of the filters corresponding to the various devices in response to message traffic on the information bus. Finally, a buffer memory can be used at each of the devices to store received messages in a queue for subsequent processing.

BRIEF DESCRIPTION OF THE DRAWINGS

The above and other objects of the invention are accomplished by a system as described herein with reference to the drawings to which.

DETAILED DESCRIPTION OF THE PREFERRED EMBODIMENTS

Figure 1:
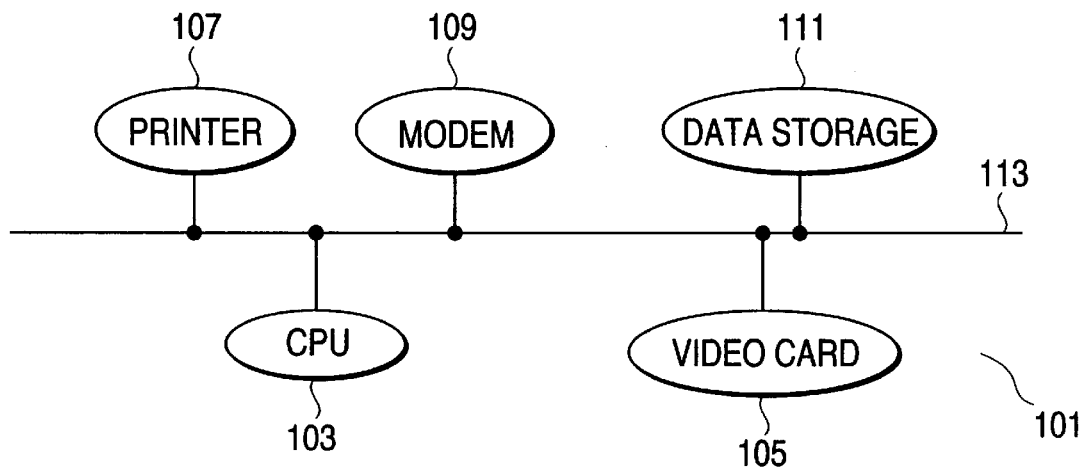
FIG. 1 is a block diagram illustrating a conventional system.

As shown in FIG. 1, a system, shown generally at 101 can include a plurality of devices such as processor 103, video card 105, printer 107, modem 109 and data storage device (CD-ROM) 111 connected over a bus 113. As previously noted, since communication can take place between only two devices at a time, it is necessary to employ various hand shaking protocols and interrupts.

A system according to the invention eliminates the need for processor interrupts to accomplish transfer of data between devices. Further, the need for hand shaking protocols is reduced. Indeed it is only necessary for the hand-shaking protocol to address the situation that occurs when a first device seeks to transmit information to a second device that is already busy. The need for hand shaking can be reduced or eliminated by providing an information buffer in each device having sufficient capacity to store and then queue messages routed to the device for processing. A back-off protocol is only necessary when the first device selected to receive information from a second device is already in the process of receiving information from a third device. This condition can be detected by a procedure in which the transmitting device monitors the average power at the frequency of a carrier selected for the information transfer and begins the transfer only when that average power is below a predetermined level.

According to the invention, data transmission between devices is modulated with a carrier associated with the destination device, so that the transmission can be distinguished for receipt by the proper device. For example, transmissions to be received by printer 107 are modulated with a first carrier having a frequency at $F_1$ and a bandwidth of $F_1+/-F_p$.

Figure 2:
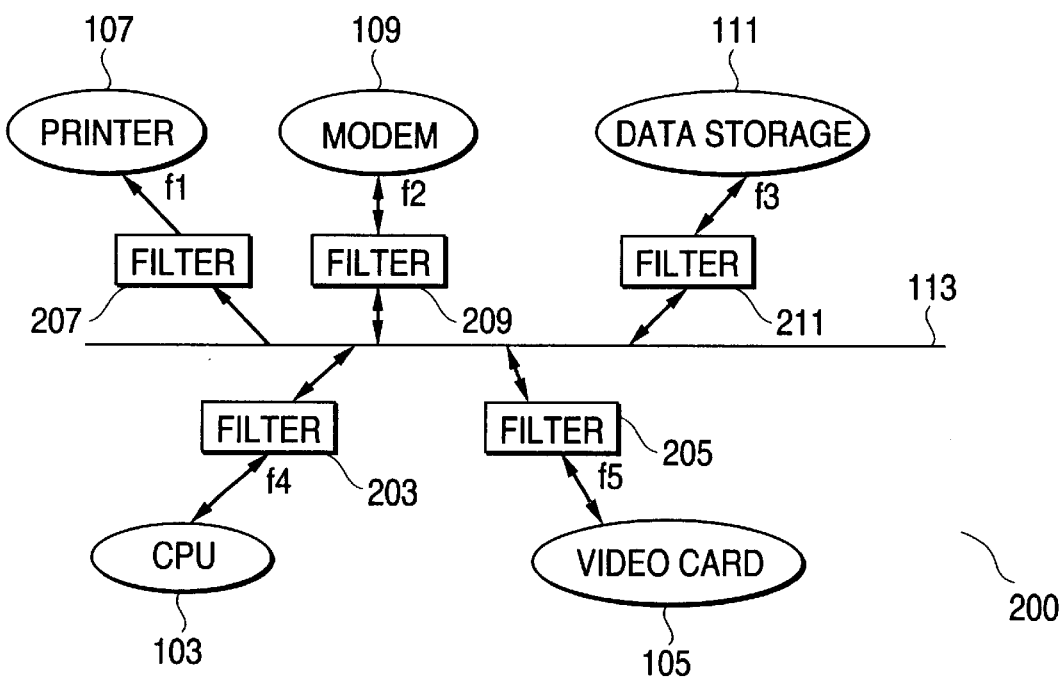
FIG. 2 is a block diagram illustrating a system according to the invention.

As shown in FIG. 2, the printer is equipped with a filter 207 to detect and demodulate information transmitted on carrier F1 only. Information transmitted on other carriers is ignored. Similarly, a video display card 105 is equipped with a filter 205 having different characteristics from filter 201 in order to detect and demodulate only those signals associated with a different carrier $F_5$. The filters for each device may be predetermined and fixed or may be programmable. If the filters are fixed, each device must be programmed to modulate its transmission to the device that it communicates with by the appropriate modulation frequency. If the filters are programmable, the programming unit, such as a control processor may broadcast to a first device the modulation characteristics assigned to that first device. Either the first device or the processor must also broadcast the modulation characteristics to all other devices which can transmit information to the first device. Ultimately, each device may signal the other devices with information concerning the modulation scheme that the device will recognize. Such signalling, which is needed to communicate modulation characteristics, can take place over a reserved control frequency channel on the information transfer bus 113 or can take place over a physically distinct signal bus or control line.

FIG. 2 illustrates a system according to the invention, shown generally at 200, with a plurality of devices and filters. The transmission medium 113 interconnects the system elements. Each of the system elements may include one or more processors 103, video cards 105, printers 107, modems 109, and data storage devices 111. It will be known of those of ordinary skill that any number or combination of these and other elements which can be linked over the information transfer medium 113 can be employed. FIG. 2 also illustrates the filters 203, 205, 207, 209 and 211 shown placed between the transmission medium 113 and corresponding system elements. Each filter is programmed to a center frequency and bandwidth which is sufficiently different from a center frequency and bandwidth of the remaining filters, so that the filter characteristics do not significantly overlap.

Figure 3:
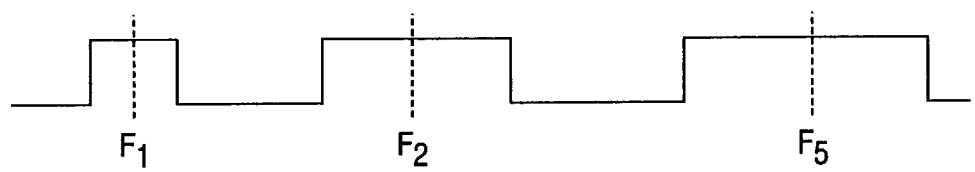
FIG. 3 is an example of frequency allocation according to the invention.

One example is shown in FIG. 3. In FIG. 3, filter 205 centered at frequency $F_5$ is provided with a comparatively wide bandwidth around the center frequency to accommodate the transfer of information to and from video card 105. In contrast, filter 207 between bus 113 and printer 107 has a frequency characteristic centered at frequency $F_1$ with a relatively narrow bandwidth.

According to the invention, data transfers between multiple, different devices can take place at the same time using frequency division multiplexing techniques. For example, CPU 103 can transmit information to printer 107 by modulating a carrier wave having a frequency within the range of filter 207, since only data travelling on a carrier within this frequency range will be accepted by filter 207 and passed on to printer 107. At the same time, data storage device 111, such as a CD ROM can transmit information to video card 105 by modulating a carrier having a frequency within the range of filter 205.

In particular, when the information transfer medium 113 is relatively short in length, or is a wide bandwidth medium, such as a fiberoptic medium, it can easily handle hundreds of megabits per second data rate. This makes it possible to transfer video, audio and high speed data information at the same time and to take advantage of the wide bandwidth capabilities of the transfer medium itself. The frequency division multiplexing technique according to the invention is another advantage over normal binary data transfer, since few interrupts are required and data can be transferred on the bus without collision and sent directly to the corresponding peripheral without delay.

Where a high data transfer rate is desired, an efficient data rate/bandwidth coding method such as phase shift keying can be employed. For example, in 32 level phase shift keying, each of the 32 values represents a possible value at one clock time. Other digital encoding techniques can also be employed. In other cases where the data requires intensive addressing rather than high data transfer rates, for example transfer of information to and from a hard drive, a baseband binary data transfer with no encoding applied may be more appropriate and can be used with the invention.

Figure 4:
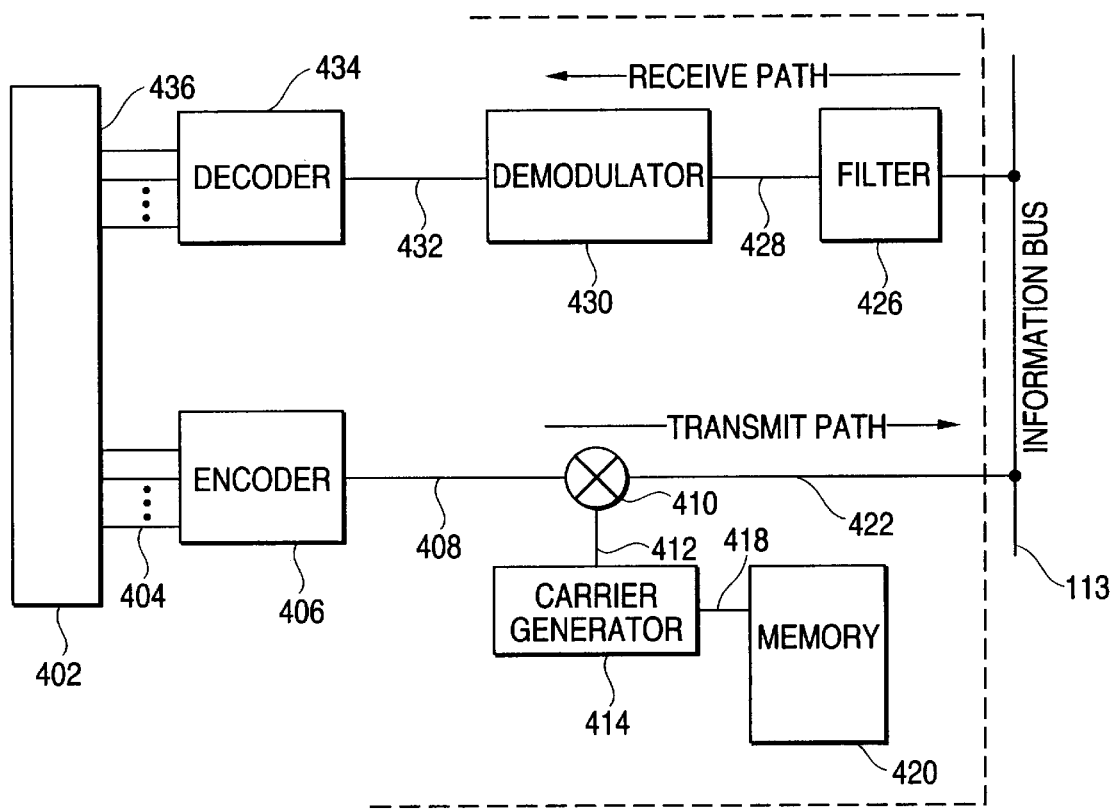
FIG. 4 is a block diagram showing portions of a device interfacing to a bus through a filter according to the invention.

FIG. 4 is a block diagram showing the interface portion of the device configured to operate according to the invention. The processing portion 402 of each device is conventional and is configured to perform the specific functions of the device, such as processing for printing, video processing, data storage, etc. Information to be transferred out of the device to another device is shown as n-bit data 404. This information is routed to the optional encoder 406, which is used to apply digital encoding, such as phase shift keying. This information, typically now in serial form on line 408, is routed to modulator 410. Modulator 410 also receives a carrier signal on line 412 from a carrier generator, such as a frequency synthesizer, 414. Carrier generator 414 may receive data and commands over line 418 from memory 420. Memory 420 typically stores the carrier frequencies to be used for each of the destination devices. Thus, carrier frequency generator 414 typically reads destination data for the information to be transferred from the signal online 408 and accesses the appropriate carrier frequency information from memory 420. Carrier frequency generator 414 provides an output carrier frequency on signal line 412 to modulator 410. Signal line 422 then supplies the carrier modulated information to the information bus 424, which carries the information to be transmitted on the carrier to the destination device. This arrangement constitutes the transmit path for information from one device to another.

The receive path of a device interface is also shown in FIG. 4. As previously noted, information on all the carriers is transmitted on information bus 424. Each device has a filter 426 through which it will receive information. All the information transmitted in accordance with the filter characteristics would be accepted by the filter, while other information may be rejected. For example, filter 426 can be a bandpass filter with a frequency centered at $F_2$ and a bandpass extending from $F_2-F_p$ to $F_2+F_p$. Filter 426 will reject all other signals. The output on signal line 428 will consist only of signals modulating the carriers centered on frequency on $F_2$ and within the bandpass of the filter itself. Demodulator 430 is used to strip off the carrier and output coded digital information on signal line 432. A decoder 434 decodes the digital information from signal line 432 and provides n-bit data into the processing portion of the device 402 on signal lines 436. It will be recognized by those of ordinary skill that signal lines 404 and 436 can be the same signal lines, such as lines input to or output from a multiplexor or using any other conventional input/output scheme. In addition, those of ordinary skill will recognize that the various elements of the interface, including encoder 406, synthesizer 414, modulator 410, filter 426, demodulator 430 and decoder 434 can be constructed either as dedicated hardware or as a software driven processor.

Figure 5:
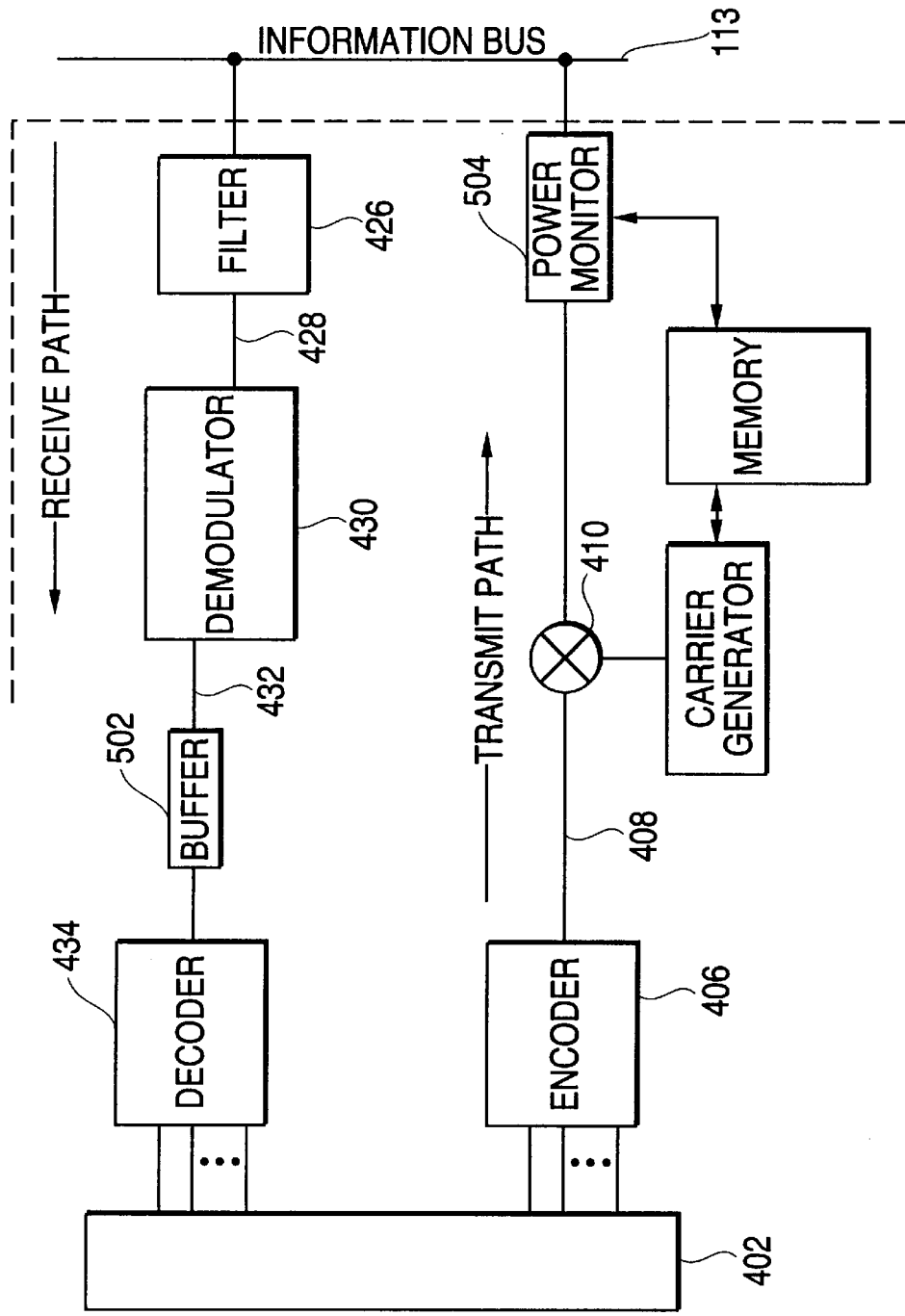
FIG. 5 shows the invention with a buffer and power monitoring circuitry.

Data intensive applications may require some information queuing and contention resolution scheme notwithstanding the modulation scheme of the invention. For example, in FIG. 2, CPU 103 may wish to transmit data to printer 107, while printer 107 is already occupied performing another printing task. A simple solution to accommodate this situation is shown in FIG. 5. Here, filter 426 receives the information which is demodulated in demodulator 430 and is routed over signal lines 432 to a buffer 502. The buffer stores the command and other information, such data to be printed, until the processing portion of the device 402 is ready to perform the necessary task.

The synchronous nature of this system may also result in circumstances where multiple devices contend for the same resource at the same time. For example, CPU 103 may attempt to send information to data storage device 111 at a frequency corresponding to the center frequency of filter 211, while at the same time modem 109 is sending information to data storing device 111 at the same center frequency. FIG. 5 shows the addition of power monitoring circuitry 504 acting as a gateway between the carrier modulated information on signal line 422 and information bus 113. Recognizing the carrier on carrier modulated information signal on 422, power monitoring circuitry 504 verifies that the energy level on information bus 113 is below a particular threshold as a way of determining that no other device is transmitting at the same carrier frequency at the same time. In one version of the system, according to the invention, power monitoring circuitry 504 would simply prevent a device from transmitting information at a carrier until the energy level at that carrier drops below the threshold, thereby indicating that the device corresponding to the carrier frequency is now ready to accept new information. A more complex system could employ priority based backoffs and interrupts, if necessary. The advantages of the invention are still preserved, however, since other data transfers can take place at other carrier frequencies without interruption.

Figure 6:
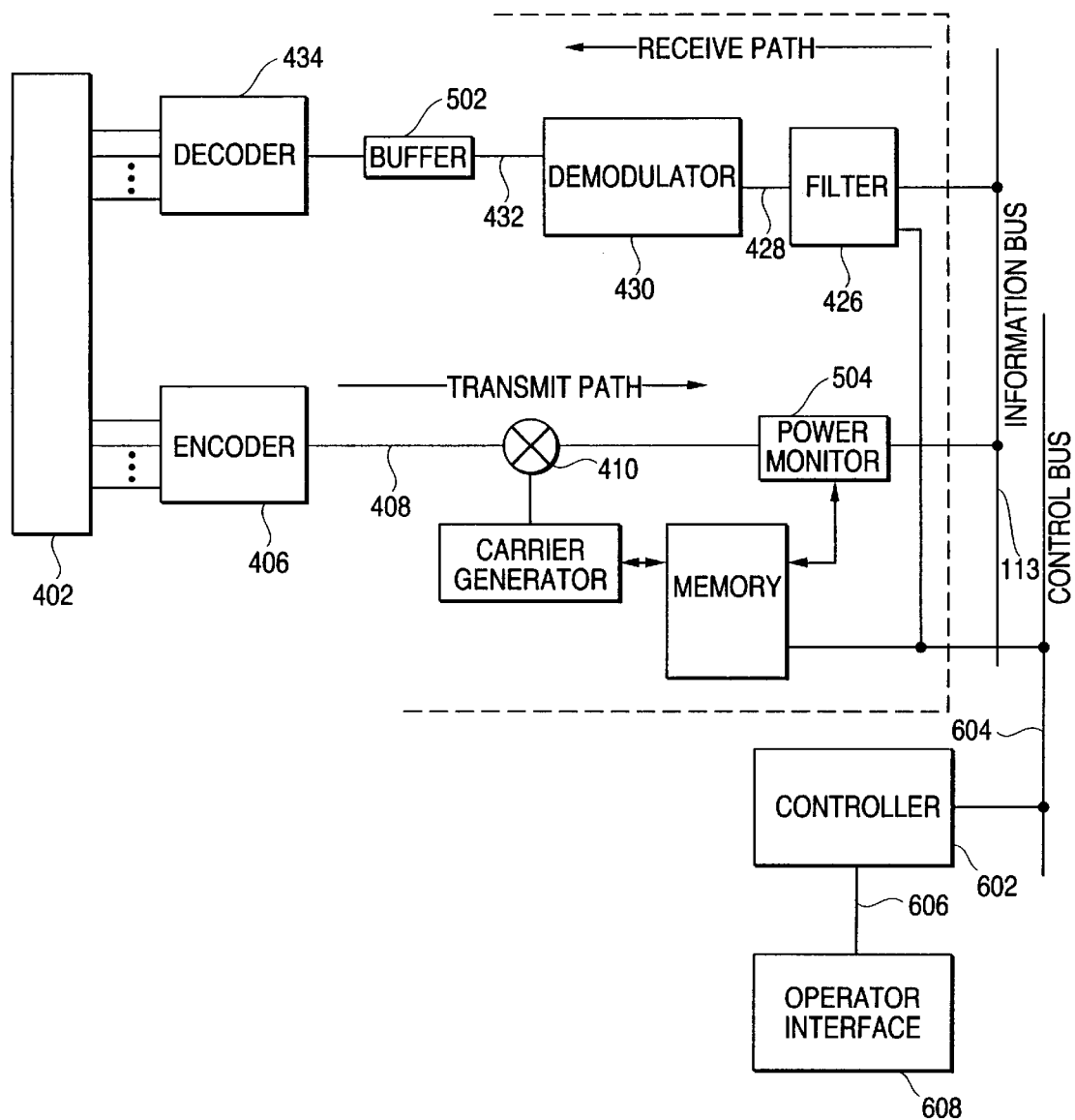
FIG. 6 shows the use of a control bus according to the invention.

FIG. 6 illustrates a further feature according to the invention to provide more system flexibility. In FIG. 6 a controller 602 transmits information over a control bus 604 to filter 426 in memory 420. Controller 602 can respond to information on line 606 from an operator interface 608 to define the allocation of carrier frequencies to the individual devices connected via information bus 113. In one embodiment, the operator using an interface, such as a keyboard 608, can provide on signal line 606 the device identities and corresponding carrier frequencies to controller 602. Controller 602 then transfers all of the center frequency information to the memory 420 and the particular center frequency information for each device to filter 426. This information transfer could take place over a dedicated control bus 604 or it could also take place over the information bus 113. In another embodiment, the operator could simply identify to controller 602 the devices that are to interconnected via information bus 113, and controller 602 could then determine an efficient carrier frequency allocation. Controller 602 then transmits this information to the memory 420 and filter 426 of each device, as previously discussed.

Controller 602 can also be used to dynamically reallocate the bus resources as a function of bus traffic, by dynamically changing the frequency and bandwidth characteristics of the filters corresponding to the individual devices. For example, when an application is running, if controller 602 determines that an excessive amount of information traffic takes place between CPU 103 and data storage device 111, the controller 602 can respond by changing the center frequency and/or broadening the bandwidth accepted by filter 211 to route data to data storage device 111. If necessary, to accommodate this change, controller 602 can reconfigure other devices at the same time and pass that information on to all the devices on the bus to control bus 604 or, alternatively, over information bus 112 as previously discussed.

The invention as described herein can be applied to stand alone computer systems or information transfer systems, whether such systems are private, public or operated by a service provider.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A computer system comprising:

a plurality of devices;

a bus communicatively linking said devices for information transfer; and an encoder receiving a parallel n-bit digital word and translating said parallel n-bit digital word into a serial bit stream, each one of said devices being linked to said bus to receive an incoming message through one of a plurality of filters having filter characteristics unique to said one;

each one of said devices further comprising a modulator for modulating an outgoing message from one of said devices acting as a message source to correspond with a filter characteristic unique to a destination device in said plurality of devices, wherein said filter characteristics comprise a different center frequency for each one of said devices, wherein said modulator in said message source imposes said outgoing message on a carrier at a frequency corresponding to a center frequency of said filter corresponding to said destination device, wherein said outgoing message comprises a digital message, and wherein said digital message is encoded as said serial bit stream.

2. A computer system as recited in claim 1, wherein said devices comprise information processing devices.

3. A computer system as recited in claim 2, wherein said information processing devices comprise a processor and a peripheral device.

4. A computer system as recited in claim 1, wherein said encoder produces said serial bit stream in at least one of phase shift keying and frequency shift keying.

5. A computer system as recited in claim 1, wherein said encoder produces a signal having n amplitude levels, n being greater than 2.

6. A computer system comprising:

a plurality of devices;

a bus communicatively linking said devices for information transfer; and a control processor transmitting filter characteristic parameters to said plurality of devices, each one of said devices being linked to said bus to receive an incoming message through one of a plurality of filters having filter characteristics unique to said one;

each one of said devices further comprising a modulator for modulating an outgoing message from one of said devices acting as a message source to correspond with a filter characteristic unique to a destination device in said plurality of devices, wherein said filter characteristics of at least one of said filters is programmable.

7. A computer system as recited in claim 6, wherein said control processor broadcasts to said devices information for storage by said devices identifying each of said devices and corresponding filter characteristics of said devices.

8. A computer system as recited in claim 7 comprising a control bus communicatively linked to said control processor with said devices for broadcasting said information.

9. A computer system as recited in claim 8, wherein said control processor monitors message traffic on said bus for information transfer and dynamically configures said filter characteristic parameters in response thereto via messages on said control bus.

10. A computer system as recited in claim 1, wherein each said device transmits to other said devices an identifier of said one device and parameters of said filter characteristic.

11. A computer system as recited in claim 1, each of said devices further comprising a buffer memory for storing received messages in a queue for later processing.

12. A computer system comprising:

a plurality of devices;

a bus communicatively linking said devices for information transfer;

each one of said devices being linked to said bus to receive an incoming message through one of a plurality of filters having filter characteristics unique to said one;

each one of said devices further comprising a modulator for modulating an outgoing message from one of said devices acting as a message source to correspond with a filter characteristic unique to a destination device in said plurality of devices, said computer system further comprising:

a control processor configured to monitor traffic on said bus and to dynamically reallocate said filter characteristics to said plurality of filters based on the monitored traffic.

\* \* \* \* \*